US012587011B2

(12) United States Patent
Soundararajan

(10) Patent No.: US 12,587,011 B2
(45) Date of Patent: Mar. 24, 2026

(54) SUBSTRATE PARASITE REDUCTION TECHNIQUE

(71) Applicant: SEMICONDUCTOR COMPONENTS INDUSTRIES, LLC, Scottsdale, AZ (US)

(72) Inventor: Srinivasa Prasad Soundararajan, Bangalore (IN)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 196 days.

(21) Appl. No.: 18/461,781

(22) Filed: Sep. 6, 2023

(65) Prior Publication Data

US 2025/0079823 A1     Mar. 6, 2025

(51) Int. Cl.
| | |
|---|---|
| *H02H 11/00* | (2006.01) |
| *H02H 3/05* | (2006.01) |
| *H02H 3/16* | (2006.01) |
| *H02J 7/00* | (2006.01) |

(52) U.S. Cl.
CPC ............. *H02H 11/003* (2013.01); *H02H 3/05* (2013.01); *H02H 3/16* (2013.01); *H02J 7/0034* (2013.01)

(58) Field of Classification Search
CPC .......... H02H 3/18; H02H 7/18; H02H 11/002; H02H 3/05; H02J 7/0034
See application file for complete search history.

(56) References Cited

U.S. PATENT DOCUMENTS

| | | | | |
|---|---|---|---|---|
| 5,539,610 | A * | 7/1996 | Williams | .............. H02J 7/0034 307/130 |
| 7,990,108 | B2 | 8/2011 | Aas et al. | |
| 8,144,444 | B2 | 3/2012 | Horsky et al. | |
| 2013/0301175 | A1* | 11/2013 | Posat | ................ H03K 17/0822 361/84 |
| 2019/0058463 | A1 | 2/2019 | Manohar et al. | |
| 2023/0096983 | A1* | 3/2023 | Nakaguchi | ........... H02H 11/003 323/271 |

FOREIGN PATENT DOCUMENTS

EP          0626745 A2     11/1994

OTHER PUBLICATIONS

Extended European Search Report for European Application No. 24168389.5, mailed Sep. 12, 2024, 9 pages.

* cited by examiner

*Primary Examiner* — Thienvu V Tran
*Assistant Examiner* — Christopher J Clark
(74) *Attorney, Agent, or Firm* — Brake Hughes Bellermann LLP

(57)          ABSTRACT

A protection circuit is disclosed for use in automotive or industrial high power integrated circuits equipped with reverse battery protection and reverse current protection. The protection circuit prevents formation of parasitic devices that could cause the high power integrated circuit to malfunction or fail to turn on. The protection circuit features asynchronous operation of a pair of MOSFETs coupled between a power supply and a load. The protection circuit can be engaged at start-up or in response to transient conditions associated with a fault.

20 Claims, 8 Drawing Sheets

GATE1

GATE2

SUBSTRATE PARASITE REDUCTION TECHNIQUE

TECHNICAL FIELD

This description relates to preventing the formation of parasitic devices in a power integrated circuit. More specifically, this description relates to implementing a protection circuit to prevent parasitic interference in a power integrated circuit that features reverse battery protection and reverse current protection.

BACKGROUND

Semiconductor device assemblies, e.g., chip assemblies, can be implemented using one or more semiconductor dies that include power direct current (DC) integrated circuits such as e-fuses, DC-DC converters, and load switches. Power transistors can include, for example, insulated-gate bipolar transistors (IGBTs), metal oxide semiconductor field effect transistors (MOSFETs), double-diffused metal oxide semiconductor (DMOS) devices, and so forth. Fast recovery diodes (FRDs) may be used in conjunction with power transistors. Such high-power chip assemblies can be used in various applications, including electric vehicles (EVs), hybrid electric vehicles (HEVs), and industrial applications.

SUMMARY

In some aspects, the techniques described herein relate to an apparatus, including: a supply terminal configured to receive a voltage supply for a circuit; a load terminal configured to be coupled to a load driven by the circuit; and a first metal oxide semiconductor field effect transistor (MOSFET) and a second MOSFET coupled in series between the supply terminal and the load terminal; wherein the first MOSFET and the second MOSFET are configured to switch on and off asynchronously.

In some aspects, the techniques described herein relate to an apparatus, further including a first charge pump coupled between a source terminal and a gate terminal of the first MOSFET.

In some aspects, the techniques described herein relate to an apparatus, wherein the first charge pump is configured to lower an on resistance of the first MOSFET.

In some aspects, the techniques described herein relate to an apparatus, further including a second charge pump coupled between a source terminal and a gate terminal of the second MOSFET.

In some aspects, the techniques described herein relate to an apparatus, wherein the first charge pump has a first clock input, the second charge pump has a second clock input, and operation of the apparatus includes running the first clock input at a higher frequency than the second clock input.

In some aspects, the techniques described herein relate to an apparatus, further including a first diode between a source terminal and a drain terminal of the first MOSFET.

In some aspects, the techniques described herein relate to an apparatus, further including a second diode between a source terminal and a drain terminal of the second MOSFET.

In some aspects, the techniques described herein relate to an apparatus, wherein, when the first MOSFET and the second MOSFET are both off, the first MOSFET protects the load from discharging into the supply voltage.

In some aspects, the techniques described herein relate to an apparatus, wherein the first MOSFET and the second MOSFET are configured to shut off at different times.

In some aspects, the techniques described herein relate to an apparatus, wherein operation of the circuit includes turning on the first MOSFET before turning on the second MOSFET.

In some aspects, the techniques described herein relate to a method, including: providing, by a protection circuit, a power integrated circuit (IC) with reverse battery protection when a reverse connection is made from the power IC to a power supply and a ground; providing the power IC with reverse current protection when a reverse flow of current occurs between the power supply and an output of the protection circuit; and preventing formation of a parasitic device between the power supply and an internal ground.

In some aspects, the techniques described herein relate to a method, wherein the parasitic device is a bipolar junction transistor.

In some aspects, the techniques described herein relate to a method, wherein coupling the protection device includes coupling a first metal oxide semiconductor field effect transistor (MOSFET) and coupling a second MOSFET, and wherein the protection device is further configured to provide the power IC with reverse current protection by activating the first MOSFET prior to activating the second MOSFET.

In some aspects, the techniques described herein relate to a method, wherein activating the second MOSFET is delayed relative to activating the first MOSFET by coupling to the second MOSFET a second clock signal having a lower frequency than a first clock signal coupled to the first MOSFET.

In some aspects, the techniques described herein relate to a method, further including coupling an RC delay network to the second MOSFET, to delay activation of the second MOSFET relative to activation of the first MOSFET.

In some aspects, the techniques described herein relate to a method, wherein coupling the protection device includes engaging the protection device during start-up of the power IC.

In some aspects, the techniques described herein relate to a method, wherein the coupling the protection device includes engaging the protection device during transient conditions of the power IC.

In some aspects, the techniques described herein relate to a circuit, including: a power supply terminal; a load terminal; and a protection device coupled between the power supply terminal and the load terminal, the protection device configured to provide reverse battery protection and reverse current protection, and to prevent formation of a parasitic path, by asynchronously activating a first MOSFET and a second MOSFET.

In some aspects, the techniques described herein relate to a circuit, wherein formation of the parasitic path includes formation of a bipolar junction transistor.

In some aspects, the techniques described herein relate to a circuit, wherein the protection device permits the circuit to operate at higher temperatures.

Figure 1:
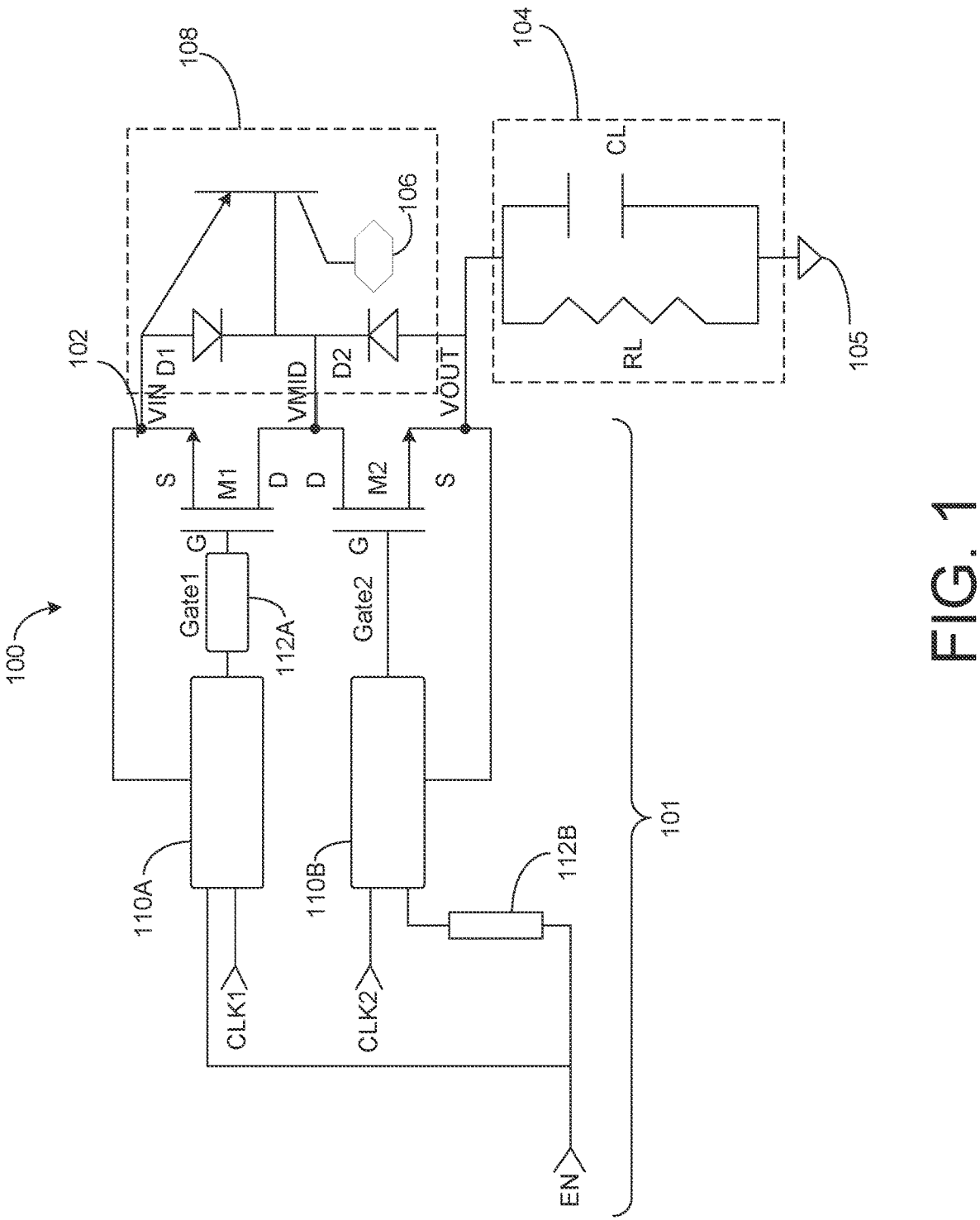
FIG. 1 is a circuit schematic of a power IC equipped with a protection circuit, according to implementations of the present disclosure.

Aspects of the present disclosure are best understood from the following detailed description when read with the accompanying figures. It is noted that, in accordance with common practice in the industry, various features in the drawings are not necessarily drawn to scale. Dimensions of the various features may be arbitrarily increased or reduced for clarity of discussion. In the drawings, like reference symbols may indicate like and/or similar components (elements, structures, etc.) in different views. The drawings illustrate generally, by way of example, but not by way of limitation, various implementations discussed in the present disclosure. Reference symbols shown in one drawing may not be repeated for the same, and/or similar elements in related views. Reference symbols that are repeated in multiple drawings may not be specifically discussed with respect to each of those drawings but are provided for context between related views. Also, not all like elements in the drawings are specifically referenced with a reference symbol when multiple instances of an element are illustrated.

DETAILED DESCRIPTION

Safety and reliability of high power electronic devices used in electric vehicles is an important concern. DC power circuits can be equipped with safety features such as reverse battery protection or reverse current protection. Reverse battery protection guards against a user connecting the battery incorrectly by coupling the supply side of the circuit to ground and the ground side of the circuit to the power supply. Reverse current protection guards against external conditions causing current to flow from the output to the power supply instead of from the power supply to the output. Such external conditions can include, for example, a large capacitance at the output, or a sudden brown-out of the power supply.

When both reverse battery protection features and reverse current protection features coexist in an integrated circuit (IC), parasitic path interactions can occur during start-up or other transient conditions. ICs that have floating substrates that can be dynamically biased are particularly susceptible to additional formation of a parasitic latch that interacts with a parasite associated with power MOSFETs of the IC. In some instances, the parasitic interactions can prevent the chip from turning on, or they can cause malfunctions or aberrations from normal circuit behavior. This disclosure relates to implementations of power integrated circuits that can mitigate the parasitic interference to prevent such errors from occurring, without adding design complexity and without incurring a penalty for increased circuit area within the chip.

Providing such safeguards may afford a competitive advantage to certain suppliers of power ICs, over those that do not address parasitic interference. Compensating for usage errors can result in prevention of unnecessary overload of the external supply (VIN) even if the part contains only reverse current protection without reverse battery protection. Compensating for usage errors can result in a higher grade IC that has a better chance of inclusion in automotive designs.

In some implementations, the protection circuit includes an additional MOSFET coupled between the power supply and the load to provide reverse current protection. However, in some implementations, one or both of the MOSFETs contribute to formation of a parasitic device, e.g., a parasitic bipolar junction transistor (BJT). In some implementations, the solution to parasitic interference involves operating the two MOSFETs asynchronously. In some implementations, the solution to parasitic interference involves activating the additional MOSFET prior to activating an existing MOSFET. In some implementations, the protection circuit is capable of preventing a parasitic device from draining the power supply to an internal ground. In some implementations, asynchronous operation of the two MOSFETs can be achieved by activating the MOSFETs using different clock signals at different frequencies. In some implementations, the protection circuit can be engaged during start-up of the power integrated circuit. In some implementations, the protection circuit can be engaged during transient conditions of the power integrated circuit.

FIG. 1 is a circuit schematic of a power integrated circuit 100 equipped with a protection circuit 101, according to a first implementation of the present disclosure. The power integrated circuit 100 includes a power supply 102, e.g., an input voltage VIN such as a battery; a load 104 at the output VOUT; and the protection circuit 101, which is coupled between the power supply 102 and the load 104 to protect the load 104 from unexpected high currents or voltages. In some implementations, the load 104 can be, for example, an RC stage in which a load resistor $R_L$ and a load capacitor $C_L$ are coupled in parallel. The load 104 as shown in FIG. 1 is representative of a generic load. That is, the load 104 can be any type of load being powered by the power supply 102. The load 104 is coupled to an external ground 105. Under certain circumstances, when the power integrated circuit 100 generates a parasitic path to ground, a connection to an internal ground 106 may be formed. One or both of the external ground 105 and the internal ground 106 can be provided by a substrate underlying the power integrated circuit 100, e.g., a silicon substrate.

In some implementations, the protection circuit 101 includes a first MOSFET M1 and a second MOSFET M2, each MOSFET having a gate terminal G, a source terminal S, and a drain terminal D. In some implementations, the drain terminals of the two MOSFETs are connected at a node having a voltage level VMID. The first MOSFET M1 can be controlled via the gate signal GATE1 by a first charge pump 110a driven by a first clock signal CLK1; the second MOSFET M2 can be controlled via the gate signal GATE2 by a second charge pump 110b driven by a second clock signal CLK2. In some implementations, the first charge pump 110a is coupled to the gate terminal and the source terminal of the first MOSFET M1, and the second charge pump 110b is coupled to the gate terminal and the source terminal of the second MOSFET M2. The first charge pump 110a delivers charge to the gate of the first MOSFET M1 to lower the on resistance RDSON for turning on the first MOSFET M1. The first charge pump 110a and the second charge pump 110*b* can be further controlled by one or more enable signals. In the implementation shown in FIG. 1, both the first charge pump 110*a* and the second charge pump 110*b* are controlled by a common enable signal EN.

In some implementations, a first body diode D1 exists between the source terminal and the drain terminal of the first MOSFET M1, and a second body diode D2 exists between the source terminal and the drain terminal of the second MOSFET M2. The first body diode D1 provides reverse current protection by preventing the load 104 from discharging into the power supply 102 when the first MOS-FET M1 and the second MOSFET M2 are off. That is, the first body diode D1 allows current flow away from the power supply 102 while blocking current flow toward the power supply 102.

In some implementations, a parasitic device 108, e.g., a parasitic current path to the internal ground 106 can be formed adjacent to the first body diode D1 and the second body diode D2 with the substrate. In some implementations, the parasitic device can include one or more parasitic body diodes and other diodes. In some implementations, the parasitic device can include a P-N-P BJT transistor. Under certain conditions, when the voltage drop from VIN to VMID is high enough, causing excessive current to flow through the first body diode D1, the parasitic BJT can be activated as an alternative current path, draining excess current into the substrate. Activating the parasitic BJT can trigger a series of actions that randomly prevent the power integrated circuit 100 from starting up, or can cause the power integrated circuit 100 start-up to be erratic. Conditions that can result in a large voltage drop at VMID include partial activation, or turn-on, of the MOSFETS M1 and M2 resulting in a high resistance across the transistors that can shift VMID with respect to VIN.

The protection circuit 101 is designed to prevent formation of the parasitic device 108 by controlling the timing of activating the first MOSFET M1 relative to activating the second MOSFET M2. For example, The parasitic device 108 can be prevented from forming by activating the first MOS-FET M1 via the gate signal GATE1 prior to, and/or for a longer duration than, activating the second MOSFET M2 via the gate signal GATE2, as shown in FIG. 2.

Figure 2:
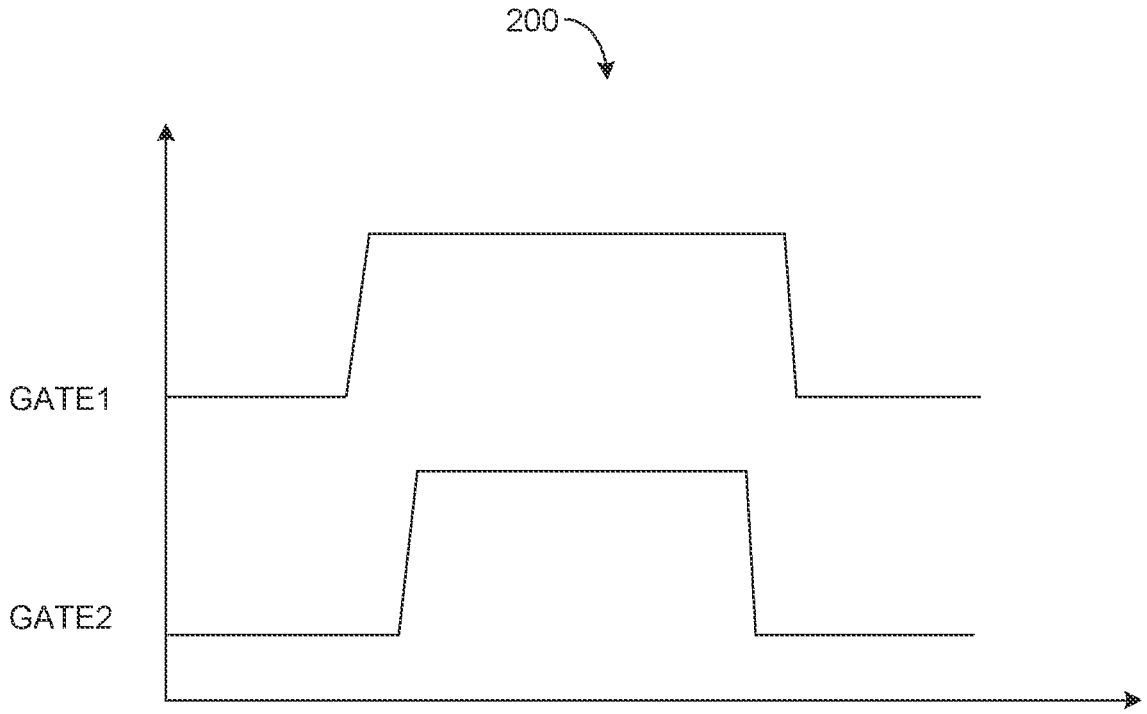
FIG. 2 is a timing diagram illustrating a generalized asynchronous gate drive, according to implementations of the present disclosure.

FIG. 2 shows a timing diagram 200, illustrating an asynchronous gate drive, according to some implementations of the present disclosure. FIG. 2 shows temporal relationships between two signals of the power integrated circuit 300: the gate signal GATE1 and the gate signal GATE2. When the gate signal GATE1 is high, the first MOSFET M1 is in an "on" state; when the gate signal GATE2 is high, the second MOSFET M2 is in an "on" state. The parasitic device 108 can be prevented from forming by turning (e.g., switching) on the first MOSFET M1 before turning (e.g., switching) on the second MOSFET M2, and by turning (e.g., switching) off the second MOSFET M2 before turning (e.g., switching) off the first MOSFET M1, to make sure the first body diode D1 is bypassed, that is, to provide an alternative current path to the first body diode D1. In some implementations, if power is not a constraint, the second MOSFET M2 can be turned off while the first MOSFET M1 remains on indefinitely. By maintaining these relationships between the first MOSFET M1 and the second MOSFET M2, the power integrated circuit 100 will allow the reverse battery protection and the reverse current protection features to coexist. Maintaining an activation sequence that will avoid triggering formation of the parasitic device 108 can be accomplished by asynchronous operation of the first MOSFET M1 and the second MOSFET M2. Use of an asynchronous gate drive prevents a condition in which both of the MOSFETs M1 and M2 are partially on. Therefore, the flow of current in the output path is constrained at start-up, so that VMID does not drop low enough to trigger the parasitic device 108. Use of the asynchronous gate drive ensures a successful start-up, and also prevents unnecessary overloading of VIN.

There are several strategies that can be used to achieve an asynchronous gate drive. In some implementations, e.g., as shown in FIG. 1, a first delay device 112*a* can be inserted between the first charge pump 110*a* and the gate terminal of the first MOSFET M1 and/or a second delay device 112*b* can be coupled between the enable signal EN and the second charge pump 110*b* to delay charging the second MOSFET M2. By adjusting the relative delays introduced by the first delay device 112*a* and the second delay device 112*b*, the first MOSFET M1 and the second MOSFET M2 can be switched on and/or off asynchronously. For example, the first MOS-FET M1 can be switched on at a first time and the second MOSFET M2 can be switched on or off at a second time after the first time. As another example, the first MOSFET M1 can be switched on or off at a first time and the second MOSFET M2 can be switched on at a second time after the first time and the second MOSFET M2 can be switched off at a third time after the second time and before the first MOSFET M1 is switched again. One or both of the first delay device 112*a* and the second delay device 112*b* can be implemented as an RC network.

Additionally or alternatively, a first enable signal EN1 and a separate, second enable signal EN2 can be used with a common clock signal, so that the first MOSFET M1 and the second MOSFET M2 switch on and/or off asynchronously. The enable signals enable activation of corresponding gate signals at the rising edge of the next clock pulse. In some implementations, the first enable signal EN1 can be set to transition before the second enable signal EN2, thus creating a turn-on delay at the second MOSFET M2. A turn-off delay for the MOSFET M1 can be achieved by delaying a disable signal of the first charge pump 110*a* associated with $V_{IN}$. Such implementations are described below with reference to FIGS. 3 and 4.

Additionally or alternatively, the first clock signal CLK1 and the second clock signal CLK2 can be set at different frequencies so that the first MOSFET M1 and the second MOSFET M2 operate asynchronously. In some implementations, the first clock signal CLK1 can be set to run at a higher frequency than the second clock signal CLK2, thus creating a turn-on delay at the second MOSFET M2. A turn-off delay for the MOSFET M1 can be achieved by delaying a disable signal of the first charge pump 110*a* associated with $V_{IN}$. When two separate clock signals are used, a common enable signal can be used. Such implementations are described below with reference to FIGS. 3 and 5.

Figure 3:
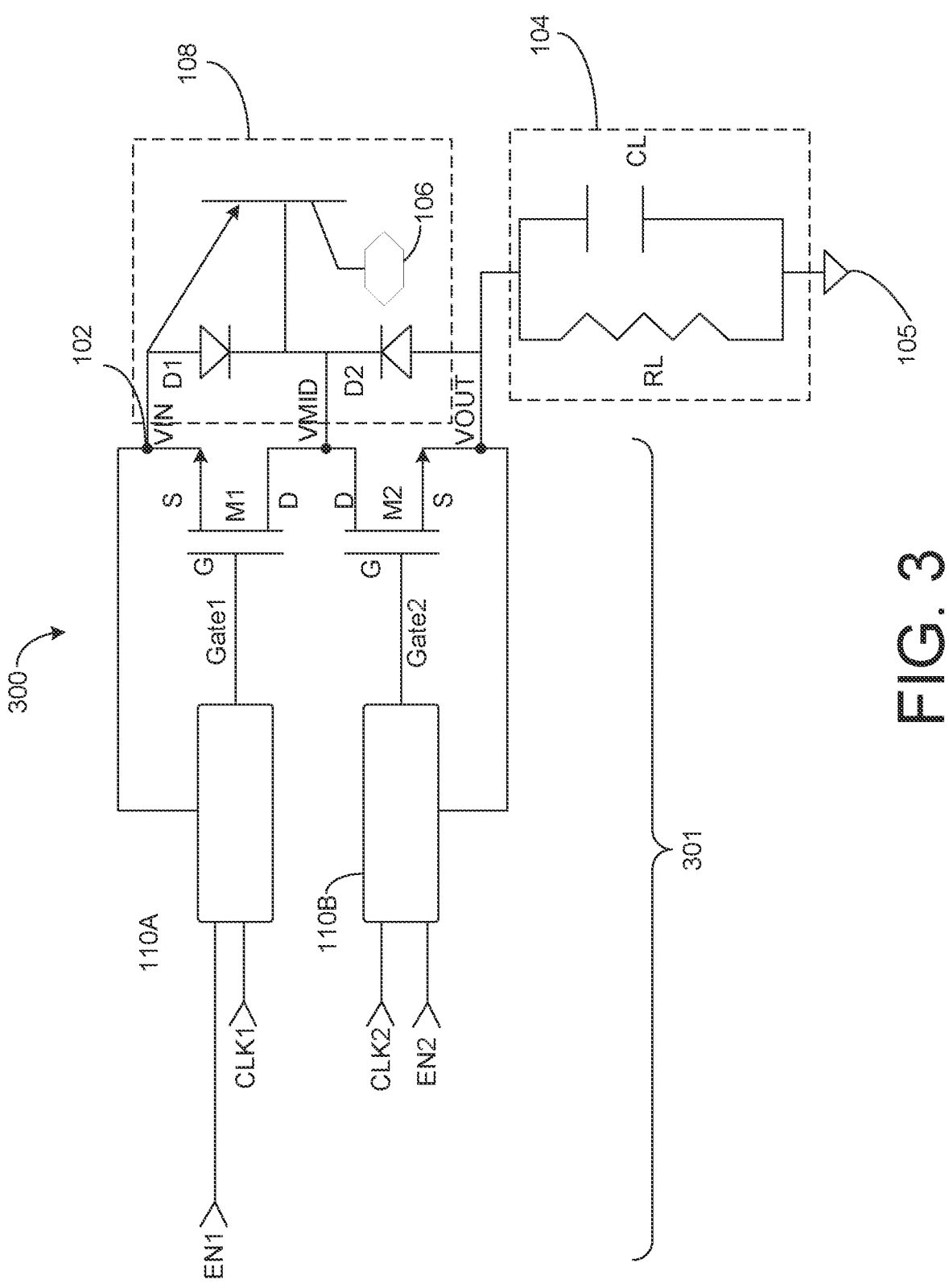
FIG. 3 is a circuit schematic of a power IC equipped with a protection circuit, according to implementations of the present disclosure.

FIG. 3 is a circuit schematic of a power integrated circuit 300 equipped with a protection circuit 301, according to a second implementation of the present disclosure. The protection circuit 301 can be used to prevent the parasitic device 108 from forming. The power integrated circuit 300 is similar to the power integrated circuit 100 except that a separate enable signal EN2 replaces the delayed enable signal EN1, created by the second delay device 112*b*, as an input into the second charge pump 110*b*. The protection circuit 301 can be configured to control the MOSFETs by separate enable signals (FIG. 4) and/or by separate clock signals (FIG. 5).

Figure 4:
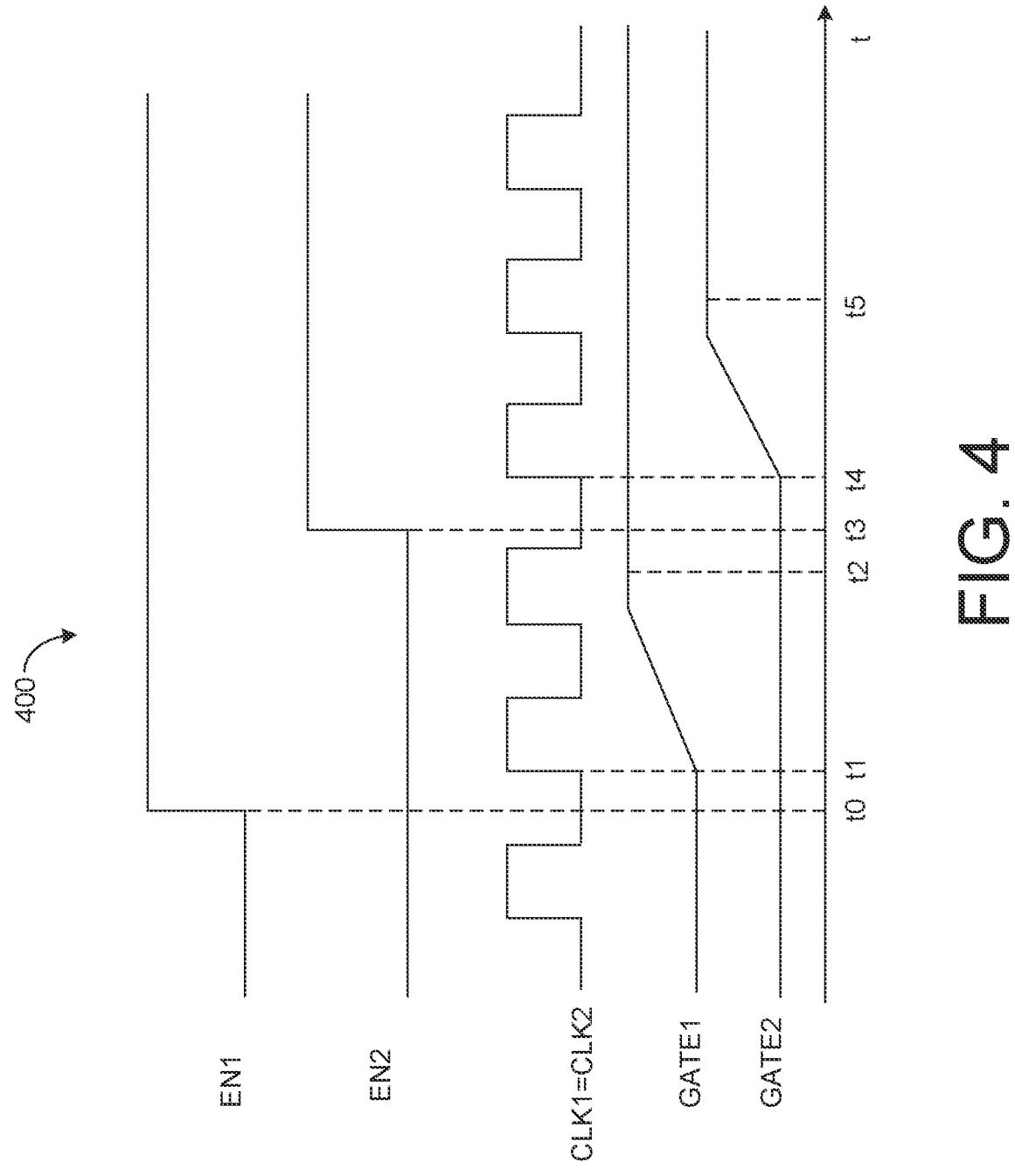
FIG. 4 is a timing diagram for an example of an asynchronous gate drive at start-up in a first mode of operation, according to implementations of the present disclosure.
Figure 5:
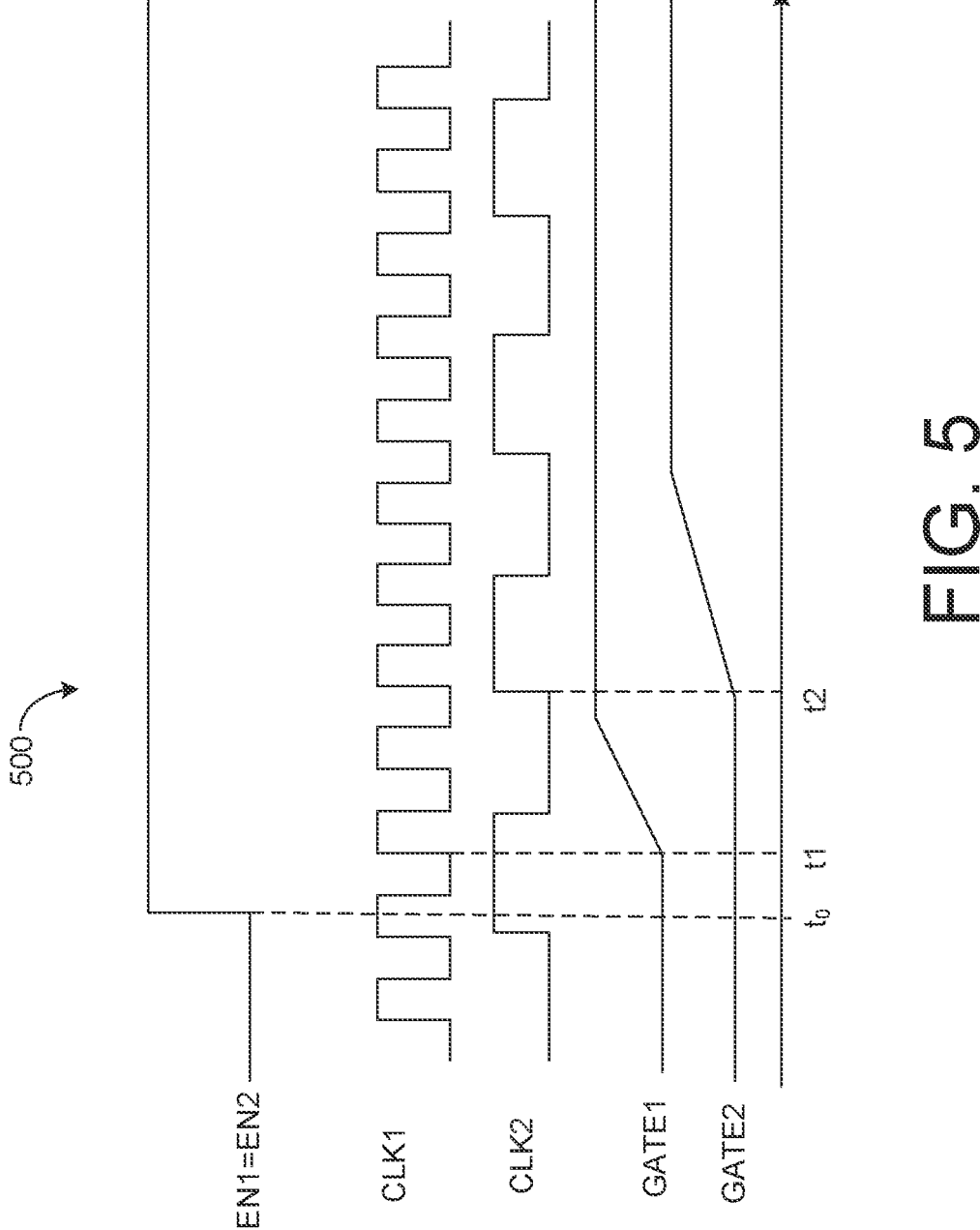
FIG. 5 is a timing diagram for an example of an asynchronous gate drive at start-up in a second mode of operation, according to implementations of the present disclosure.

FIG. 4 shows a timing diagram 400, illustrating a first mode of operating the power integrated circuit 300 shown in FIG. 3, according to some implementations of the present disclosure. FIG. 4 shows temporal relationships between five signals at start-up of the power integrated circuit 300: a first enable signal EN1, a second enable signal EN2, a common clock signal CLK1=CLK2, a gate signal GATE1 that drives the first MOSFET M1, and a gate signal GATE2 that drives the second MOSFET M2. FIG. 4 illustrates use of the protection circuit 301 to achieve an asynchronous gate drive, in which the clock signals CLK1 and CLK2 shown in FIG. 3 are tied together so they are substantially identical, and the enable signal EN2 is delayed relative to the enable signal EN1.

As shown in FIG. 4, the enable signal EN1 transitions from low to high at a time t0. The transition of the enable signal EN1 initiates a rise of the gate signal GATE1 at the next clock pulse, which turns on the first MOSFET M1 at t1. In some implementations, the first MOSFET is fully on at a time t2, after at least one more clock pulse. Meanwhile, the second MOSFET M2 is still off. Next, the enable signal EN2 is set to transition from low to high at time t3 after the first MOSFET M1 is fully on. The transition of the enable signal EN2 initiates a rise of the gate signal GATE2 at the next clock pulse, which turns on the second MOSFET M2 at time t4. In some implementations, the second MOSFET M2 is fully on at a time t5, after at least one more clock pulse.

By the time the second gate signal GATE2 begins ramping up, the first gate signal GATE1 is already fully on, so that there is never a time when the gate signal GATE1 and the gate signal GATE2 are both in transition while connected to the load. The two MOSFETs do not turn on at the same time nor do they have an overlap in their turn-on transition. By staggering the turn-on times of the MOSFETS M1 and M2 in this fashion, VMID is sustained at a high level e.g., less than 1 VF below VIN, so that parasitic action is prevented because peak current flow through the parasitic transistor is limited.

FIG. 5 shows a timing diagram 500, illustrating a second mode of operating the power integrated circuit 300 shown in FIG. 3, according to some implementations of the present disclosure. FIG. 5 shows temporal relationships between five signals at start-up of the power integrated circuit 300: a common enable signal EN1=EN2, the clock signal CLK1, the clock signal CLK2, the gate signal GATE1 that drives the first MOSFET M1, and the gate signal GATE2 that drives the second MOSFET M2, according to a third implementation of the present disclosure. FIG. 5 illustrates use of the power integrated circuit 300 to achieve an asynchronous gate drive, in which the enable signals EN1 and EN2 are tied together so they are substantially identical, and clock signals CLK1 and CLK2 have different frequencies.

As shown in FIG. 5, the enable signals EN1 and EN2 transition together from low to high at a time t0 coinciding with, as a random example, the middle of the second clock pulse of the clock signal CLK1. The transition of the enable signals EN1 and EN2 enables the next clock pulse of the clock signal CLK1 to initiate a rise of the gate signal GATE1, which turns on the first MOSFET M1 at time t1. At the same time t0, the enable signals EN1 and EN2 also enable the next clock pulse of the clock signal CLK2 to initiate a rise of the gate signal GATE2, which turns on the second MOSFET M2 at time t2. However, due to the frequency difference, the clock time period of the second clock signal CLK2 is longer. This delays the charge pump settling time for the gate signal GATE2 Therefore the gate signal GATE2 takes several clock pulses to build up. Meanwhile, the gate signal GATE1 is already fully on. Thus, again there is never a time when the gate signal GATE1 and the gate signal GATE2 are both in transition while connected to the load. Consequently, VMID is sustained at a high level e.g., less than 1 VF below VIN, so that parasitic action is prevented.

The frequencies of the clock signals CLK1 and CLK2 can be selected during a design phase to be different enough so as to ensure that the gate signal GATE1 is fully on before the gate signal GATE2 begins to transition. Again, the two MOSFETs M1 and M2, because they do not turn on at the same time, or have a temporal overlap in their turn-on transition, are configured to provide protection against parasitic action. In contrast, unprotected circuits may be recognized by their use of a shared clock signal and a shared enable signal that are both used to activate both MOSFETs simultaneously.

Figure 6:
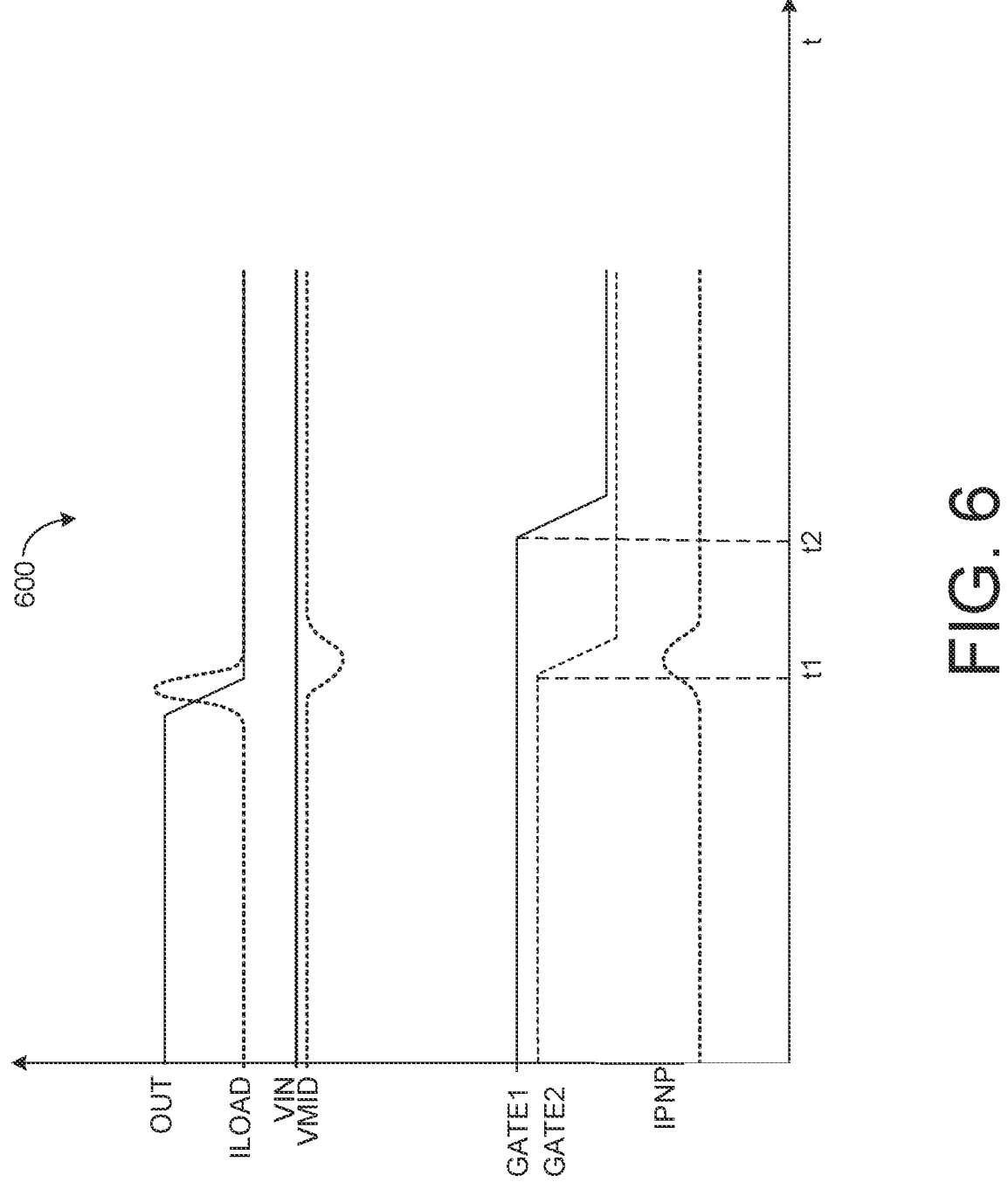
FIG. 6 is a timing diagram illustrating an asynchronous gate drive response to a fault mode, according to implementations of the present disclosure.

FIG. 6 is a timing diagram 600 corresponding to a mode of operating the power integrated circuit 300 shown in FIG. 3, according to some implementations of the present disclosure. The timing diagram 600 shows seven signals in response to a fault such as a short to ground or a circuit breaker event: the output voltage VOUT, load current ILOAD, source voltage VIN, VMID, the gate signal GATE1 that drives the first MOSFET M1, the gate signal GATE2 that drives the second MOSFET M2, and a parasitic current IPNP associated with the parasitic device 108. The circuit breaker event may cause a large current to flow through the two series MOSFETs. When the fault is sensed, if the first MOSFET M1 and the second MOSFET M2 are shut off at the same time, during the transition from an on state to an off state, the first MOSFET M1 and the second MOSFET M2 both offer a high resistance, causing both of the body diodes D1 and D2 to turn on. However, if the first MOSFET M1 remains on while the second MOSFET M2 is shut off, the on resistance of the first MOSFET M1 remains low and constrains the voltage across the body diode D1. Such an event that grounds the output voltage will cause a spike in the load current as shown in the top graph of FIG. 6. In response, VMID will dip as current is drained away. However, because the gate signal GATE1 is delayed, only the second MOSFET M2 is turned off, the first MOSET continues to provide reverse current protection, which reduces the voltage droop at VMID. Consequently, although the parasitic device forms, the parasitic current IPNP is small compared to the load current ILOAD, and small compared to a circuit in which both of the MOSFETs turn off with no delay.

Figure 7:
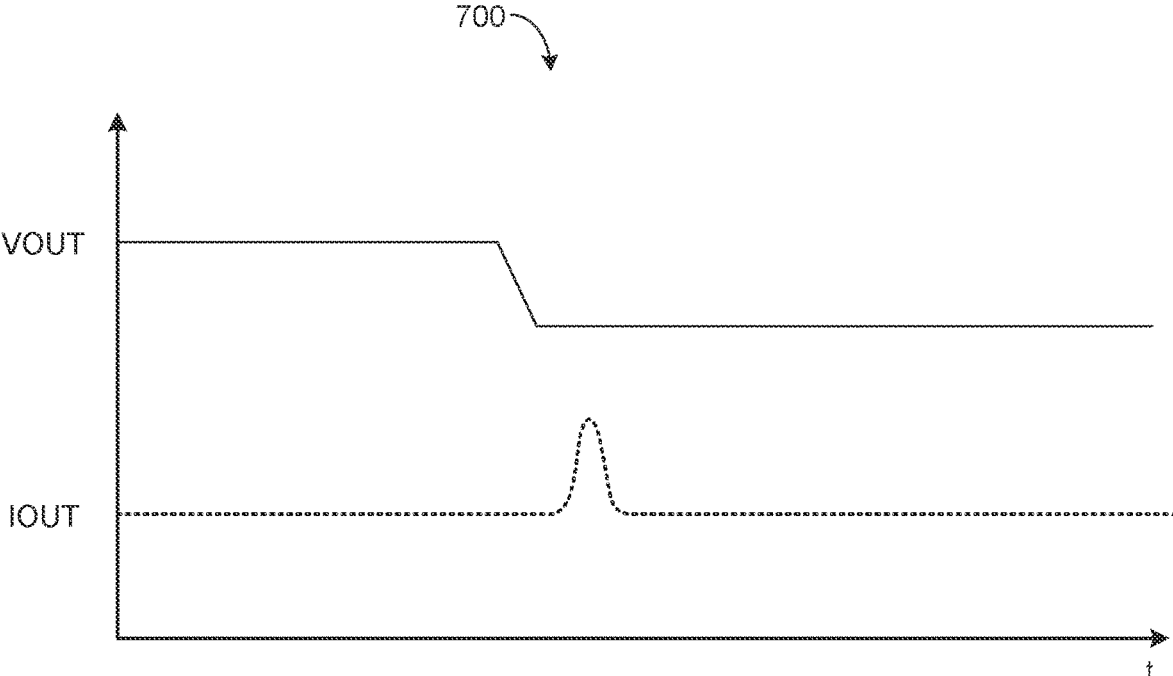
FIG. 7 is a timing diagram illustrating an asynchronous gate drive response to a fault mode, according to implementations of the present disclosure.

FIG. 7 is a timing diagram 700 corresponding to a mode of operating the power integrated circuit 300 shown in FIG. 3, according to some implementations of the present disclosure. The timing diagram 700 shows two signals in response to a fault such as a short to ground or a circuit breaker event: the output voltage VOUT, and output current IOUT. FIG. 7 illustrates how the architecture of the protection circuit 301 avoids a malfunction when a short occurs, or when the circuit starts up. When current flows into the substrate via the parasitic device 108, unwanted loading of the supply voltage VIN can occur, which can trigger a protection device such as an electronic fuse (e-fuse) which is designed to latch off, that is, to permanently shut off, the output voltage and current in response to the event. If the parasitic device 108 forms, it can cause the latch off function to be incomplete so that the VOUT and IOUT signals exhibit transient fluctuations instead of remaining at zero. By suppressing the parasitic device, the protection circuit 301 ensures that the latch off is effective in keeping the VOUT and IOUT signals in an off state as shown in the timing diagram 700.

Figure 8:
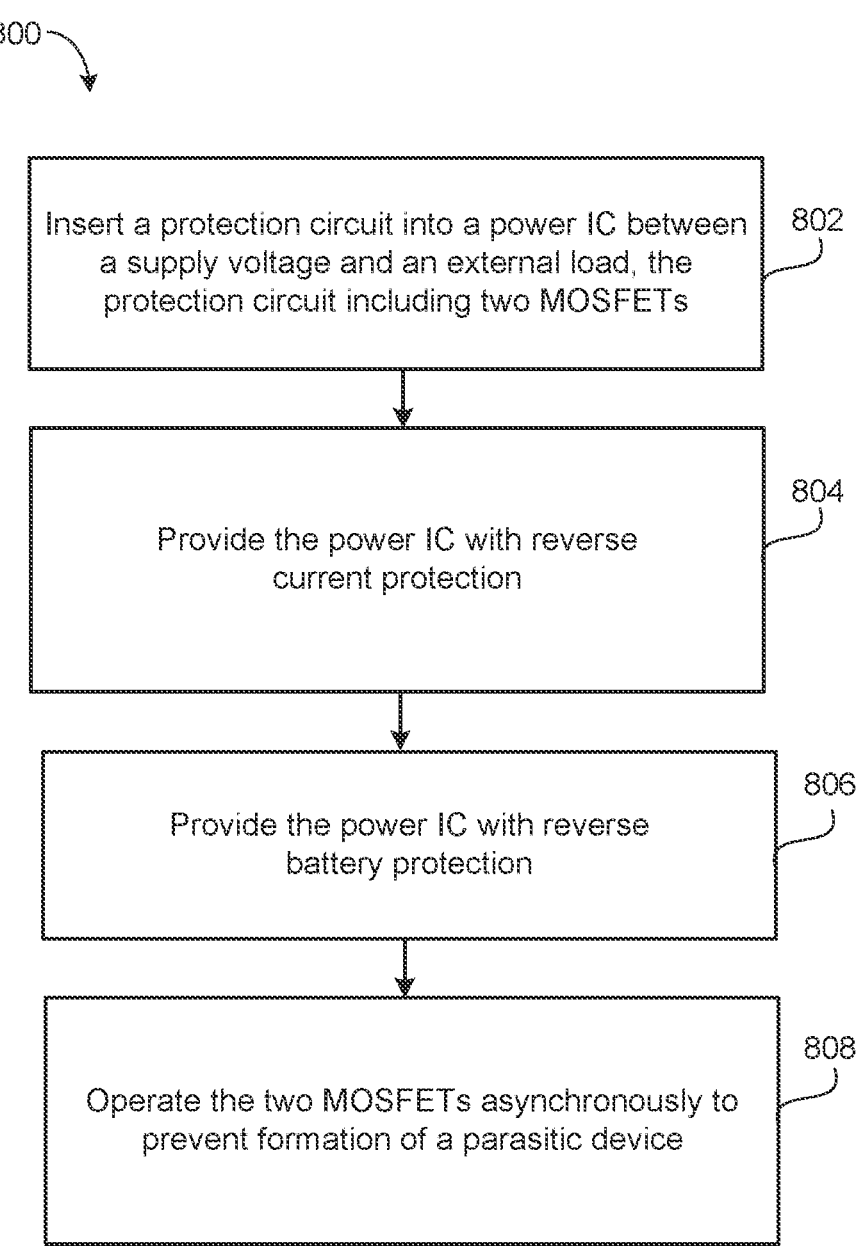
FIG. 8 is a flow diagram illustrating a method of preventing formation of parasitic devices in a protection circuit, according to implementations of the present disclosure.

FIG. 8 is a flow chart summarizing a method 800 for protecting a power IC, in accordance with some implementations of the present disclosure. Protection of the power IC e.g., the power integrated circuit 100 or the power integrated circuit 300 prevents triggering the formation of parasitic devices. Operations 802-810 of the method 800 can be carried out to form the power integrated circuit 100, according to some implementations as described above with reference to FIGS. 1-7. Operations of the method 800 can be performed in a different order, or not performed, depending on specific applications. It is noted that the method 800 may not produce a complete the power integrated circuit 100. Accordingly, it is understood that additional processes can be provided before, during, or after the method 800, and that some of these additional processes may be briefly described herein.

At 802, the method 800 includes inserting a protection circuit, e.g., the protection circuit 101 or the protection circuit 301, into a power IC, e.g., the power integrated circuit 100 or the power integrated circuit 300 between a supply voltage, e.g., the power supply 102 (VIN) and an external load, e.g., the load 104, the protection circuit 101 or 103 including two MOSFETs, e.g., the first MOSFET M1 and the second MOSFET M2. The protection circuit can be inserted into any power IC to protect against a power-to-ground condition or a circuit breaker event. In some implementations, the two MOSFETs are coupled in series between the power supply 102 and the load 104, and the first MOSFET is coupled between the power supply 102 and the second MOSFET. Under normal conditions, both the first MOSFET M1 and the second MOSFET M2 are in an "on" state.

At 804, the method 800 includes providing the power IC with reverse current protection. In some implementations, reverse current protection can be provided by the first MOSFET M1 and the second MOSFET M2 coupled in series as shown in FIG. 1 and operated asynchronously as shown in FIG. 2. In some implementations, reverse current protection can be provided by the first MOSFET M1 and the second MOSFET M2 coupled in series as shown in FIG. 3, and operated asynchronously as shown in FIG. 4, FIG. 5, or FIG. 6.

At 806, the method 800 includes providing the power IC with a reverse battery protection circuit. In some implementations, the reverse battery protection circuit can introduce additional parasitic devices that interact with parasites of the first MOSFET M1 and the second MOSFET M2 of the reverse current protection circuit. When the disclosed circuits and methods are implemented as described herein, the impact of such interaction between the parasites can be mitigated, making the power IC robust in its start-up and overload operations.

At 808, the method 800 includes operating the two MOSFETs asynchronously to prevent formation of a parasitic device. Asynchronous operation can be achieved by activating the first MOSFET M1 and the second MOSFET M2 at different times. During a start-up phase, first MOSFET M1 may be turned on prior to turning on the second MOSFET M2, and in particular, waiting until the first MOSFET M1 is fully on before initiating turning on the second MOSFET M2 so that neither one of the MOSFETs is partially on while connected to the load 104. In response to a circuit breaker event, operation of the first MOSFET M1 can be sustained while turning off the second MOSFET M2 to keep a low resistance across the diode, thereby suppressing formation of a parasitic device. One method of asynchronous operation involves using a common clock signal with staggered enable signals for the two MOSFETs, as shown and described with respect to FIG. 4. Another method of asynchronous operation involves controlling each MOSFET using a different clock signal, e.g., by clock signals of different frequencies, as shown and described with respect to FIG. 5. Another method of asynchronous operation involves inserting one or more delay devices ahead of the gate drive signals for the two MOSFETs, as shown and described with respect to FIG. 6

By preventing formation of the parasitic device, asynchronous operation of the MOSFETs extends the temperature range of the protection circuit. That is, the parasitic device will not be activated until a higher temperature is reached. With the protection circuit 101 or the protection circuit 301 in place, the parasitic device can sustain a higher load at a given temperature, without turning on. Consequently, the protection device permits the circuit to operate at higher temperatures, so that the temperature margin of the power integrated circuit 100 is increased.

As described above, various implementations of a protection circuit that employs an asynchronous gate drive can suppress formation of parasitic devices that could otherwise cause malfunction of a power IC. In particular, the risk of parasitic interactions is relevant when both reverse battery protection and reverse current protection are provided by the protection circuit. Various implementations of an asynchronous gate drive are described with reference to signal timing diagrams during start-up and in response to a fault.

It will be understood that, in the foregoing description, when an element, such as a layer, a region, or a substrate, is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, top, bottom, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

Some implementations may be implemented using various semiconductor processing and/or packaging techniques. Some implementations may be implemented using various types of semiconductor device processing techniques associated with semiconductor substrates including, but not limited to, for example, silicon (Si), silicon carbide (SiC), gallium arsenide (GaAs), gallium nitride (GaN), and/or so forth.

While certain features of the described implementations have been illustrated as described herein, many modifications, substitutions, changes, and equivalents will now occur to those skilled in the art. For instance, features illustrated with respect to one implementation can, where appropriate, also be included in other implementations. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. An apparatus, comprising:
a supply terminal configured to receive a voltage supply for a circuit;
a load terminal configured to be coupled to a load driven by the circuit; and
a first metal oxide semiconductor field effect transistor (MOSFET) and a second MOSFET coupled in series between the supply terminal and the load terminal, the first MOSFET and the second MOSFET being configured to switch on and off asynchronously, the first MOSFET having a gate controlled by a first clock signal and the second MOSFET having a gate controlled by a second clock signal, the first clock signal having a frequency different from a frequency of the second clock signal.

2. The apparatus of claim 1, further comprising a first charge pump coupled between a source terminal and a gate terminal of the first MOSFET.

3. The apparatus of claim 2, wherein the first charge pump is configured to lower an on resistance of the first MOSFET.

4. The apparatus of claim 2, further comprising a second charge pump coupled between a source terminal and a gate terminal of the second MOSFET.

5. The apparatus of claim 4, wherein the first charge pump has a first clock input, the second charge pump has a second clock input, and operation of the apparatus includes running the first clock input at a higher frequency than the second clock input.

6. The apparatus of claim 1, further comprising a first diode between a source terminal and a drain terminal of the first MOSFET.

7. The apparatus of claim 1, further comprising a second diode between a source terminal and a drain terminal of the second MOSFET.

8. The apparatus of claim 1, wherein, when the first MOSFET and the second MOSFET are both off, the first MOSFET protects the load from discharging into the voltage supply.

9. The apparatus of claim 1, wherein the first MOSFET and the second MOSFET are configured to shut off at different times.

10. The apparatus of claim 1, wherein operation of the circuit includes turning on the first MOSFET before turning on the second MOSFET.

11. A method, comprising:
providing a power integrated circuit (IC) with reverse current protection when a reverse flow of current occurs between a power supply and an output of a protection circuit, the protection circuit including a first metal oxide semiconductor field effect transistor (MOSFET) and a second MOSFET coupled in series between a supply terminal of the power supply and a load terminal of the power IC, the reverse current protection including activating the first MOSFET prior to activating the second MOSFET by coupling to the second MOSFET a second clock signal having a lower frequency than a first clock signal coupled to the first MOSFET; and
preventing formation of a parasitic device between the power supply and an internal ground.

12. The method of claim 11, wherein the parasitic device is a bipolar junction transistor.

13. The method of claim 11, further comprising coupling an RC delay network to the second MOSFET, to delay activation of the second MOSFET relative to activation of the first MOSFET.

14. The method of claim 11, wherein the reverse current protection is provided during start-up of the power IC.

15. The method of claim 11, wherein the reverse current protection is provided during transient conditions of the power IC.

16. A circuit, comprising:
a power supply terminal;
a load terminal; and
a protection device including:
a first metal oxide semiconductor field effect transistor (MOSFET) and a second MOSFET coupled in series between the power supply terminal and the load terminal;
a first charge pump coupled to a first gate of the first MOSFET;
a second charge pump coupled to a second gate of the second MOSFET;
a first delay device coupled between the first charge pump and the first gate; and
a second delay device coupled between an enable signal and the second charge pump, the protection device configured to provide reverse battery protection and reverse current protection, and to prevent formation of a parasitic path, by asynchronously activating the first MOSFET and the second MOSFET using the first delay device and the second delay device.

17. The circuit of claim 16, wherein formation of the parasitic path includes formation of a bipolar junction transistor.

18. The circuit of claim 16, wherein the protection device permits the circuit to operate at higher temperatures.

19. The circuit of claim 16, wherein the first charge pump is driven by a first clock signal and the second charge pump is driven by a second clock signal, and wherein a frequency of the first clock signal is different from a frequency of the second clock signal.

20. The circuit of claim 16, wherein the enable signal controls the first charge pump and the second charge pump.

* * * * *